H. P. THOMPSON.
SPOT LAMP FOR AUTOMOBILES AND THE LIKE.
APPLICATION FILED JUNE 2, 1919.
1,388,220.
Patented Aug. 23, 1921.
3 SHEETS—SHEET 1.
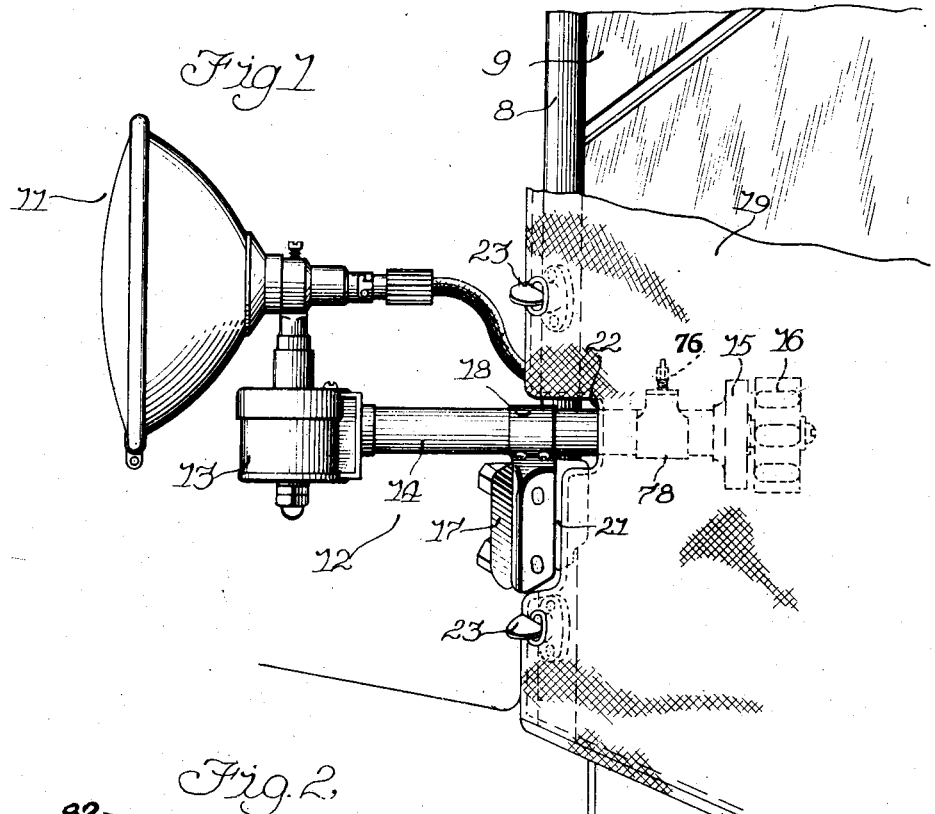
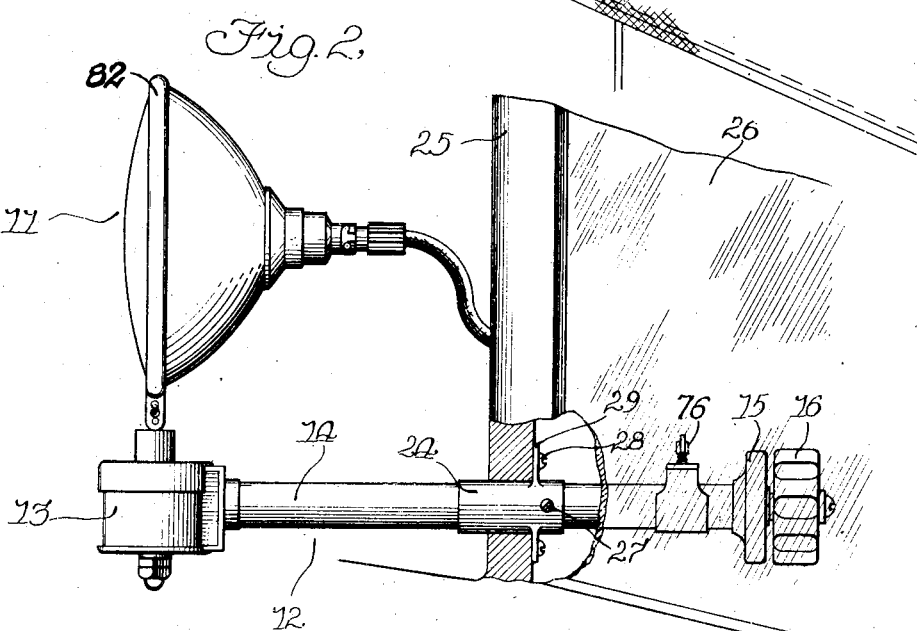
Inventor
Henry P. Thompson
By Brown Boettcher & Dienner
Attorneys H. P. THOMPSON.
SPOT LAMP FOR AUTOMOBILES AND THE LIKE.
APPLICATION FILED JUNE 2, 1919.
1,388,220.
Patented Aug. 23, 1921.
3 SHEETS—SHEET 2.
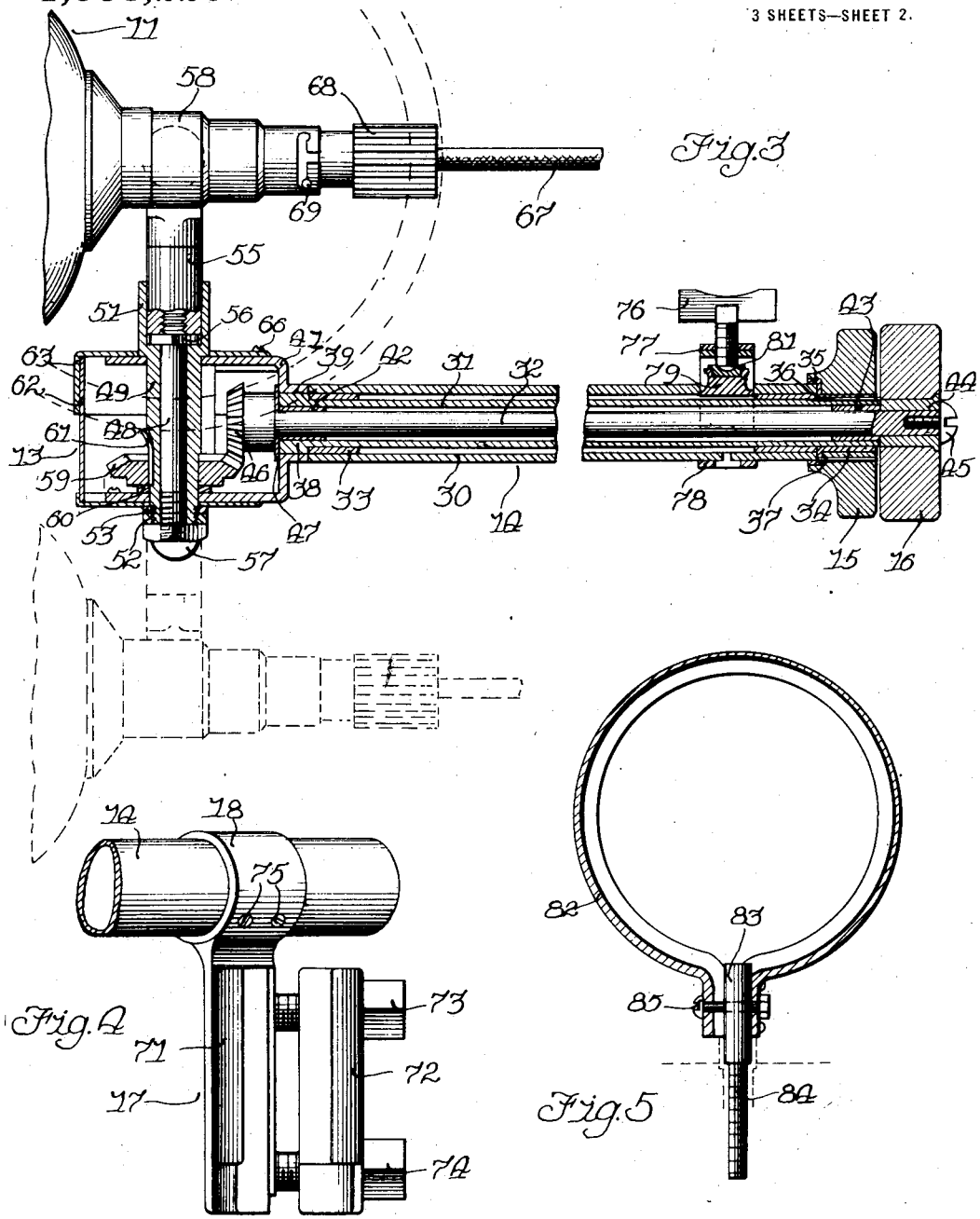

H. P. THOMPSON.
SPOT LAMP FOR AUTOMOBILES AND THE LIKE.
APPLICATION FILED JUNE 2, 1919.

1,388,220.

Patented Aug. 23, 1921.
3 SHEETS—SHEET 3.

Inventor
Henry P. Thompson
By Brown Boettcher & Deiner
Attorneys

UNITED STATES PATENT OFFICE.

HENRY P. THOMPSON, OF CHICAGO, ILLINOIS.

SPOT-LAMP FOR AUTOMOBILES AND THE LIKE.

1,388,220.  Specification of Letters Patent.  Patented Aug. 23, 1921.

Application filed June 2, 1919. Serial No. 301,167.

*To all whom it may concern:*

Be it known that I, HENRY P. THOMPSON, a citizen of the United States, residing at 1520 East 66th Place, Chicago, in the county of Cook and State of Illinois, have invented a certain new and useful Improvement in Spot-Lamps for Automobiles and the like, of which the following is a full, clear, concise, and exact description, reference being had to the accompanying drawings, forming a part of this specification.

My invention relates to spot lamps for automobiles and the like.

More particularly, my invention relates to improved control mechanism for spot lamps embodying control members which extend into the driver's compartment of the automobile in convenient position for operation of the lamp, the lamp being supported exteriorly of the car where there will be no interference with the light beam. By the provision of this control mechanism, the lamp may be mounted at any point of vantage either to the side or in front of the wind shield and controlled from a protected point within the driver's compartment within easy access to the driver. This is of particular convenience in stormy weather, when its permits of the convenient operation of the spot lamp without the attendant inconvenience of opening the side curtains and getting wet. Furthermore, it permits of a more successful adaptation of spot lamps to inclosed cars, such as limousines, etc., by affording mechanism for controlling the lamp from a point within the car.

The primary object of the present invention is to simplify and facilitate the operation of such types of spot lamp control mechanisms, by providing an improved and simplified form of apparatus which can be operated with maximum facility. The lamp is arranged to be adjusted in two distinct planes of adjustment, and by combining adjustments in these two planes, the lamp may be positioned at any desired angle. According to the present invention, the desired facility of operation of the control mechanism is secured by providing independent operating handles for controlling the adjustment of the lamp in each distinct plane of adjustment. By this construction, the necessity for clutches, and intricate longitudinal motions of the control handle is entirely avoided, each control handle in the present form having a simple rotational adjusting motion independent of the other handle.

A further object of the invention is to provide a simplified and compact form of control mechanism, with a view to devising an automobile accessory which can be manufactured at comparatively low cost for use on all classes of cars and with all grades of spot lamps. I have also devised a system of universal mounting clamps designed to permit of interchangeable mounting of different types of spot lamps on my improved construction of control mechanism, whereby the control mechanism may be sold as a unitary appliance for use with any of the conventional forms of spot lamps.

In the accompanying drawings I have illustrated a preferred embodiment of my invention to instruct those skilled in the art how to make and use the same.

In the drawings:

Figure 1 is a fragmentary perspective view illustrating the application of my improved form of lamp to an open body type of car;

Fig. 2 is a similar view illustrating the lamp as applied to a closed body type of car; the control mechanism being illustrated as having a universal clamping attachment mounted thereon for interchangeably receiving different types of spot lamps.

Fig. 3 is an enlarged vertical sectional view through the control mechanism of the lamp as arranged in Fig. 1;

Fig. 4 is an enlarged view of the clamp used in mounting the lamp on the wind shields of open cars;

Fig. 5 is a sectional view of the clamping band for universally adapting different styles of lamps to my improved control mechanism;

Figure 6:
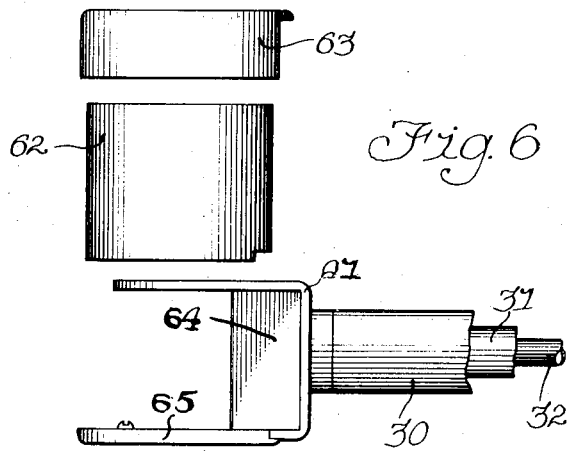
Fig. 6 is a fragmentary elevational view of the rotatable head member with its casing sections removed.

In Fig. 1, I have shown the lamp and its control mechanism embodied in unit form and mounted on the side rail 8 of the automobile wind-shield 9. The lamp 11, which may be of any conventional type is supported at the outer end of the operating mechanism 12 so as to have freedom of movement in any plane. The operating mechanism 12 comprises the rotatable head member 13, on which the lamp 11 is supported, the horizontal stem portion 14 and the control knobs 15 and 16 at the inner end of the stem portion 14. The lamp and operating mechanism are supported as an entirety by a split clamp 17 which clamps to the side rail 8 of the wind-shield 9, and has a band portion 18 encircling the horizontal stem portion 14. The band portion 18 is twisted slightly with respect to the body of the clamp 17 so as to project the stem and lamp diagonally outward from the corner of the wind shield and avoid obstructing the view of the driver.

In Fig. 2, I have illustrated my improved spot lamp mounted on a closed type of automobile body. The stem 14 is mounted in a sleeve 24 which is extended through a vertical corner rail 25 or other frame member of the limousine body 26. The stem 14 is rigidly clamped in the sleeve 24 by keying or by the set screw 27, and the sleeve 24 is held in the vertical corner rail 25 by screws or bolts 28 passing through lugs 29 on the sleeve and tapping into the rail 25.

In Fig. 3, I have shown the detail construction of the control mechanism. The stem 14 consists of a tubular sleeve 30, which forms a housing for the inclosed operating sleeve 31 and a central operating shaft 32. The operating sleeve 31 is of smaller diameter than the interior of the outer housing sleeve 30 and is spaced therefrom by a bushing 33 at the front end and a flanged bushing 34 at the rear end. The flanged bushing 34 has a vertically and laterally extending flange 35 which embraces the end of the outer housing sleeve 30 and thus supports the rear end of the operating sleeve 31. The operating sleeve 31 is rigidly keyed to rotate with the flanged bushing 34 by a small pin key 36. The control knob 15 is rigidly fastened to the flanged bushing 34 by a series of pins 37 which project into the vertical flange 35 of the bushing 34. The other end of the operating sleeve 31 is formed with an enlarged hub portion 38 which is pinned or otherwise secured in an annular flange 39 on the rear of a yoke shaped frame 41 which supports the gearing in the rotatable head member 13.

The central shaft 32 is of a smaller diameter than the interior of the operating sleeve 31 and is in turn spaced therefrom by bushings 42 and 43 at its front and rear ends respectively. The rear end of the shaft 32 projects outward beyond the innermost knob 15 and has rigidly secured thereto the end knob 16. The knob 16 is lined with a hub or bushing 44 which is preferably secured to the projection of the shaft 32 by a taper fit. A screw 45 taps into a hole in the end of the shaft 32 and serves to draw the bushing 44 up onto the tapered end of the shaft 32.

The other end of the central shaft 32 projects into the rotatable head member 13 between the two extensions of the yoke shaped frame 41 and has rigidly secured thereto a small bevel pinion 46. An anti-friction washer 47 is interposed between the hub of the pinion 46 and the wall of the yoke shaped frame 41.

The horizontal extensions of the yoke shaped frame 41 support a transversely extending shaft or stem member which carries the spot lamp 11. This shaft or stem member is arranged for rotatable movement whereby the spot lamp may be angularly adjusted relative to the rotatable head member 13. The shaft or stem member is made up of several parts and comprises a central stud bolt 48 and a surrounding sleeve 49. The sleeve 49 is retained between the extensions of the frame 41 by an enlarged socket portion 51 formed at the upper end of the sleeve which bears on the upper extension of the frame 41, and by a nut 53 which threads over the other end of the sleeve and bears against the lower extension of the frame 41. A washer 53 is interposed between the nut 52 and the lower frame extension and it will be apparent that by the manipulation of the nut 52 the frictional engagement of the sleeve in the frame 41 can be made of any desired degree.

Extending down into the socket portion 51 is a stem member 55 which carries the lamp 11. The stud bolt 48 taps up into the bottom of the stem member 55 and is locked therein by a check nut 56. The lower end of the stud bolt 48 receives a cap nut 57 by which the check nut 56 can be drawn down tightly against the bottom of the socket 51, thereby rigidly locking the stem member 55 and stud bolt 48 in the sleeve 49. The upwardly projecting stem 55 may be rigidly fastened to the lamp 11, or may be provided with a releasable attaching device for interchangeably receiving different styles of lamp, as I shall presently describe. In the embodiment shown in Fig. 3, the stem 55 has rigid connection with the tubular socket extension 58, preferably by means of a threaded stud projecting from the stem and threading into the member 58.

Angular adjustment is given this stem member by a bevel gear 59 which meshes with the bevel pinion 46 in the rotatable head member 13. The bevel gear 59 is rigidly keyed to the sleeve 49 by a key 61 and is confined against longitudinal movement on this sleeve by a small circumferential shoulder in the sleeve 49 which bears on the hub of the gear and by an anti-friction washer 60 which is interposed between the gear and the lower extension of the frame 41.

The rotatable head member 13 is inclosed by the cylindrical casing section 62 and the annular cover member 63. It will be noted from Fig. 6 that the frame 41 is provided with lateral wing extensions 64 on each side which close off the rear part of the frame 41. The cylindrical casing 62 is segmental in shape and is adapted to fit down over the front and sides of the frame 41 with its vertical edges contacting with the wing extensions 64 on each side. The lower edge of the cylindrical casing 62 is adapted to seat in a shallow cup 65 formed by a flanged disk which is secured to the lower extension of the frame 41. The annular cover member 63 is arranged to fit down over the cylindrical casing 62 and hold the casing in place by the engagement of two screws 66 in the upper extension of the frame 41.

The vertical margin of the side curtain 19 is preferably cut back or recessed as indicated at 21 to clear the clamp 17, and is cut back still farther at 22 to clear the stem 14. This is not essential, however, as it is possible to stretch the curtain over the clamp and stem by releasing one or more of the fasteners 23, if desired.

Current is supplied to the lamp 11 in the ordinary manner through conductors 67 which have connection with contacts in the end of the removable plug member 68. This plug member is adapted to be inserted into the tubular socket member 58 on the rear of the lamp 11 where its contacts engage with spring contact pins which have electrical connection with the bulb in the lamp. The plug member 68 is normally retained in the tubular socket member 58 by the ordinary bayonet slot connection 69.

The clamp 17 for mounting the lamp and operating mechanism on the wind-shield 9 is shown in greater detail in Fig. 4. The clamp comprises the two semi circular clamping members 71 and 72 which are joined by the two cap screws 73 and 74. The diagonally set band portion 18 is made integral with the clamping member 71 and has small screws 75 which tap into and rigidly hold the stem 14 therein.

It will be apparent from the foregoing that by manipulating the control knobs 15 and 16 the lamp may be given any angular adjustment desired. Rotation of the end knob 16 operates through the gears 46 and 59 to angularly adjust the position of the lamp 11 about the transverse axis of the stem 55. Rotation of the other knob 15 operates through the sleeve 31 to rotate the entire head member 13, and thus the lamp 11, in a vertical plane. The two planes of adjustment of the lamp are illustrated by the dotted line positions in Fig. 3. The control knobs 15 and 16 can be easily rotated with one hand thereby permitting of quick and easy adjustment of the lamp.

The spot lamp is held in its different positions of adjustment by the frictional engagement of the parts of the operating mechanism. The lamp is retained in its different positions of angular adjustment about the axis of the stem 55 by the frictional engagement of the sleeve 49 in the frame 41 which frictional engagement may be made of any desired degree by manipulation of the nut 52, as I have previously described. The frictional engagement of the control knob 15 abutting the end of the stationary housing 30, and the friction between the sleeve 31, and its supporting bushings, is normally sufficient to retain the lamp 11 and head member 13 in any position in the vertical plane of adjustment. To insure this retention of the lamp and head member in its positions of vertical adjustment, however, I provide a clamping screw 76 adjacent the knobs 15 and 16, which is operable to rigidly clamp the sleeve 31 in any angular position. The clamping screw 76 threads through a bridge piece 77 which is formed in a band 78 encircling the stem 14. The outer housing sleeve 30 has a substantially semi-circular slot cut therein under the bridge piece 77, and disposed in this slot is a segmental clamping member 79. The end of the clamping screw 76 engages in a depressed washer or cup 81 which seats in the top of the segmental clamping member 79. It will be apparent that by rotation of the screw 76 the clamping member 79 can be forced down against the operating sleeve 31 with sufficient pressure to insure holding of the lamp 11 and head 13 in any of its positions of adjustment.

I also contemplate embodying my invention in the form of an accessory for operating spot lamps which will have attaching devices for the universal attachment of any style or size of spot lamp whereby the motorist is enabled to use his own spot lamp in connection with my improved operating mechanism. In Fig. 5, I have illustrated a split band of U shaped cross section for embracing and clamping to the periphery of the lamp reflector in the manner illustrated in Fig. 2. One end of the split band 82 is riveted or otherwise secured to the enlarged head 83 of the stem or bolt 84. The other end of the band 82 is bent downward to embrace the enlarged head portion 83 similarly to the riveted end, and is provided with a bolt 85 passing through the band and head 83 for contracting the band 82 about the periphery of the reflector. The stem or bolt 84 is adapted to be inserted in the rotatable sleeve 49 in place of the stud bolt 48 (Fig. 3). The bottom of the enlarged head 83 is adapted to seat in the socket portion 51 and by drawing up tight on the cap nut 57 on the other end of the stem 84, it will be apparent that the split band 82 will be rigidly mounted to rotate with the sleeve 49. These split band units can be supplied in different sizes to take care of wide variations in the sizes of the lamps.

Figure 7:
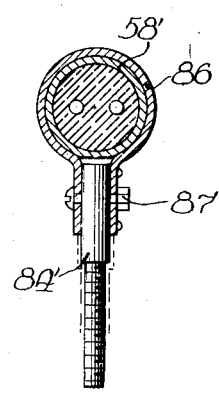
Fig. 7 is a view of another type of clamp for receiving different styles of lamps.

In Fig. 7, I have illustrated a modified arrangement for clamping to the lamp around the stem or socket portion 58', corresponding to the socket extension 58 of Fig. 3. The band 86 is riveted to a similar bolt or stem 84', and is adapted to be contracted about the socket extension 58' by the screw 87.

I do not intend to be limited to the precise details of construction shown and described except as they are defined in the appended claims.

I claim:

1. In a device of the class described, the combination of a relatively stationary tubular mounting member comprising means for mounting the same on or adjacent the windshield of the automobile, an operating sleeve extending through said mounting member and being rotatable therein, a rotatable hollow head on the forward end of said operating sleeve and adapted for rotation concentrically about the axis of said sleeve, said hollow head comprising a yoke member, and a separate cover member closing said yoke member, a rotatable stem extending through said hollow head and having bearing support in both arms of said yoke member, said stem projecting from said hollow head, a spot lamp supported on the projecting end of said stem with the axis of said spot lamp displaced laterally relative to the axis of said operating sleeve, a first bevel gear on said stem between the arms of said yoke member, an operating shaft extending concentrically through said operating sleeve, bearing surfaces in said operating sleeve adjacent the ends of said shaft for spacing the intermediate portion of said shaft from said operating sleeve, a second bevel gear on said operating shaft meshing with said first bevel gear, a first control knob rigidly mounted on the rear end of said operating sleeve, a second control knob positioned to the rear of said first control knob and rigidly mounted on the rear end of said operating shaft, each of said control knobs being capable of rotation independently of the other or simultaneously therewith for the adjustment of the spot lamp in its different planes, said control knobs adjusting said spot lamp through said operating sleeve and shaft solely by rotational adjusting motion of said knobs.

2. In a device of the class described, the combination of a relatively stationary mounting sleeve adapted for mounting on or adjacent the wind-shield of the automobile, an operating sleeve extending through said mounting sleeve and being rotatable therein, a rotatable hollow head on the forward end of said sleeve adapted for rotation concentrically about the axis of said operating sleeve, said hollow head comprising a yoke member and a separate cover member closing said yoke member, a rotatable stem extending through said hollow head and having bearing support in both arms of said yoke member, said stem projecting from said hollow head for supporting a spot lamp with the axis thereof displaced laterally with respect to the axis of said operating sleeve, a first bevel gear on said stem, an operating shaft extending through said operating sleeve, a second bevel gear on said operating shaft meshing with said first bevel gear, and control mechanism for actuating said operating sleeve and said operating shaft for adjusting the spot lamp.

3. In a device of the class described, the combination of a relatively stationary tubular mounting member, an operating sleeve extending through said tubular mounting member and being rotatable therein, a hollow head on the outer end of said sleeve adapted for rotation concentrically about the axis of said sleeve, a rotatable member pivotally journaled in said head at an angle to the axis of said operating sleeve, said rotatable member arranged for supporting a spot lamp with the axis thereof off-set laterally with respect to the axis of said sleeve, a gear rigidly mounted on said rotatable member, an operating shaft extending through said operating sleeve for independent rotation therein, a second gear rigidly connected to said operating shaft within said hollow head and meshing with said first gear, a first operating handle rigidly mounted on the rear end of said operating sleeve, and a second operating handle positioned to the rear of said first operating handle and rigidly mounted on the rear end of said operating shaft, each of said operating handles being capable of rotation independently of the other for the adjustment of the spot lamp in its different planes, the operating motion of each of said control handles for rotating said operating sleeve and operating shaft being solely rotational.

4. In a device of the class described, the combination of a relatively stationary tubular mounting member comprising means for mounting the same on or adjacent the windshield of the automobile, an operating sleeve extending through said tubular mounting member and being rotatable therein, a rotatable member on the outer end of said sleeve adapted for rotation concentrically about the axis of said sleeve, a rotatable stem pivotally mounted in said rotatable member and projecting laterally therefrom at an angle to the axis of said operating sleeve, a spot lamp supported on the projecting end of said stem, an operating shaft extending concentrically through said operating sleeve for independent rotation therein, means operatively connecting said operating shaft with said stem, a first operating handle rigidly mounted on the rear end of said operating sleeve, and a second operating handle positioned to the rear of said first operating handle and rigidly mounted on the rear end of said operating shaft, each of said operating handles being capable of rotation independently of the other for the adjustment of the spot lamp in its different planes, each of said operating handles operating to actuate its respective operating sleeve or shaft solely by rotational adjusting motion.

5. In a device of the class described, the combination of a tubular supporting member, a rotatable sleeve extending through said supporting member, a hollow head rigidly carried on the outer end of said sleeve and rotatable therewith, a stem member pivotally mounted in said hollow head, a spot lamp carried on said stem member, a bevel gear on said stem member within said hollow head, a shaft extending concentrically through said sleeve, a bevel gear on said shaft within said hollow head and meshing with said first bevel gear, a first operating handle having rotational motion only for actuating said sleeve, a second operating handle having rotational motion only for actuating said shaft, and detent mechanism for restraining said lamp in various positions of adjustment.

6. In a spot lamp, an outer housing sleeve for mounting said lamp, a rotatable head member at one end of said housing sleeve, a rotatable stem projecting through said head member and being attached to said lamp, a gear in said head member connected to said stem, a second gear in said head member meshing with the first gear, concentric operating members extending through said tubular housing, the inner of said operating members having connection with said second gear, the outer of said operating members having connection with said head member, and control knobs at the other end of said housing sleeve having connection with said operating members, each of said control knobs having rotational adjusting motion independently of the other.

In witness whereof I hereunto subscribe my name this 29th day of May, 1919.

HENRY P. THOMPSON.